US008934752B2

(12) United States Patent
Teo et al.

(10) Patent No.: US 8,934,752 B2

(45) Date of Patent: Jan. 13, 2015

(54) LATCHING MECHANISM FOR A MODULE

(71) Applicant: Finisar Corporation, Sunnyvale, CA (US)

(72) Inventors: Tat Ming Teo, Singapore (SG); Chris Togami, San Jose, CA (US); Frank Flens, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 13/784,730

(22) Filed: Mar. 4, 2013

(65) Prior Publication Data

US 2013/0178090 A1 Jul. 11, 2013

Related U.S. Application Data

(62) Division of application No. 12/573,637, filed on Oct. 5, 2009, now Pat. No. 8,391,667.

(51) Int. Cl.
*G02B 6/00* (2006.01)
*H01R 13/627* (2006.01)
*H01R 13/629* (2006.01)

(52) U.S. Cl.
CPC ........ *H01R 13/6271* (2013.01); *H01R 13/6272* (2013.01); *H01R 13/62911* (2013.01)
USPC .......................................... 385/139; 292/197

(58) Field of Classification Search
CPC ........... H01R 13/6271; H01R 13/6272; H01R 13/62911
USPC ................................ 385/139; 361/1; 292/197
See application file for complete search history.

(56) References Cited

U.S. PATENT DOCUMENTS

| | | | | | |
|---|---|---|---|---|---|
| 4,249,760 | A | * | 2/1981 | Conley | 292/197 |
| 4,636,018 | A | | 1/1987 | Stillie | |
| 5,214,730 | A | | 5/1993 | Nagasawa et al. | |
| 5,267,407 | A | * | 12/1993 | Bornancini | 42/70.08 |
| 5,619,604 | A | | 4/1997 | Shiflett et al. | |
| 5,676,408 | A | * | 10/1997 | Davidian | 292/197 |
| 5,682,450 | A | | 10/1997 | Patterson et al. | |
| 5,732,174 | A | | 3/1998 | Carpenter et al. | |
| 5,737,463 | A | | 4/1998 | Weiss et al. | |
| 5,743,785 | A | | 4/1998 | Lundberg et al. | |

(Continued)

FOREIGN PATENT DOCUMENTS

| | | |
|---|---|---|
| CN | 102100010 A | 6/2011 |
| EP | 0439939 | 9/1995 |

(Continued)

OTHER PUBLICATIONS

Office Action mailed Jun. 27, 2014 in U.S. Appl. No. 12/717,352.

(Continued)

*Primary Examiner* — Charlie Peng
(74) *Attorney, Agent, or Firm* — Maschoff Brennan

(57) ABSTRACT

One embodiment includes a latching mechanism having a latch, a cam and a slider. The cam is configured to rotate about an axis of rotation. The cam is also configured to displace an end of the latch when the cam is rotated about the axis of rotation. The slider is operably connected to the cam and is configured to cause the cam to rotate about the axis of rotation.

19 Claims, 10 Drawing Sheets

(56) References Cited

U.S. PATENT DOCUMENTS

| | | | | |
|---|---|---|---|---|
| 6,085,003 | A | 7/2000 | Knight | |
| 6,422,760 | B1 | 7/2002 | Matasek et al. | |
| 6,533,603 | B1 | 3/2003 | Togami | |
| 6,616,233 | B1 * | 9/2003 | Debus et al. | 297/341 |
| 6,843,670 | B2 * | 1/2005 | Yamaguchi et al. | 439/159 |
| 6,848,836 | B2 | 2/2005 | Ueda et al. | |
| 6,884,097 | B2 | 4/2005 | Ice | |
| 6,886,988 | B2 | 5/2005 | Brown et al. | |
| 6,929,403 | B1 * | 8/2005 | Arciniegas et al. | 385/55 |
| 7,114,857 | B1 | 10/2006 | Kayner et al. | |
| 7,118,281 | B2 * | 10/2006 | Chiu et al. | 385/53 |
| 7,156,562 | B2 | 1/2007 | Mazotti et al. | |
| 7,217,043 | B2 | 5/2007 | Schunk | |
| 7,303,336 | B2 | 12/2007 | Kayner et al. | |
| 7,309,173 | B2 | 12/2007 | Epitaux et al. | |
| 7,448,899 | B2 | 11/2008 | Chen et al. | |
| 7,731,432 | B2 | 6/2010 | Theodoras et al. | |
| 7,766,672 | B1 | 8/2010 | Chiang | |
| 7,841,779 | B1 | 11/2010 | Bianchini et al. | |
| 7,967,590 | B2 | 6/2011 | Grunitz et al. | |
| 8,057,109 | B2 | 11/2011 | Flens et al. | |
| 8,113,723 | B2 | 2/2012 | Togami et al. | |
| 8,292,518 | B2 | 10/2012 | Togami et al. | |
| 8,328,435 | B2 | 12/2012 | Teo et al. | |
| 8,391,667 | B2 * | 3/2013 | Teo et al. | 385/139 |
| 8,459,881 | B2 | 6/2013 | Togami et al. | |
| 2002/0115342 | A1 | 8/2002 | Stricot et al. | |
| 2003/0048996 | A1 | 3/2003 | Lowe et al. | |
| 2003/0072137 | A1 | 4/2003 | Yen et al. | |
| 2004/0120660 | A1 | 6/2004 | Go et al. | |
| 2005/0208822 | A1 * | 9/2005 | Ishigami et al. | 439/372 |
| 2005/0254821 | A1 | 11/2005 | Theodoras | |
| 2005/0259994 | A1 | 11/2005 | Zhang et al. | |
| 2005/0265650 | A1 | 12/2005 | Priyadarshi et al. | |
| 2006/0262026 | A1 | 11/2006 | Gainey et al. | |
| 2006/0280408 | A1 | 12/2006 | Anderson et al. | |
| 2007/0058911 | A1 | 3/2007 | Yu et al. | |
| 2008/0044143 | A1 | 2/2008 | Wang et al. | |
| 2008/0226239 | A1 | 9/2008 | Oki et al. | |
| 2009/0253292 | A1 | 10/2009 | Wu | |
| 2009/0279831 | A1 | 11/2009 | Luo et al. | |
| 2011/0081119 | A1 | 4/2011 | Togami et al. | |
| 2012/0190223 | A1 | 7/2012 | Wu | |
| 2014/0044398 | A1 | 2/2014 | Teo et al. | |

FOREIGN PATENT DOCUMENTS

| | | |
|---|---|---|
| EP | 2283145 | 2/2011 |
| JP | 09-171127 | 6/1997 |
| WO | 2009143293 | 11/2009 |

OTHER PUBLICATIONS

The International Search Report and the Written Opinion of the International Searching Authority, International Application No. PCT/US2009/044740, date of mailing Jun. 7, 2010.

Supplementary European Search Report completed Aug. 24, 2011 in connection with corresponding European Patent Application No. 09 75 1521 (5 pgs).

International Search Report and Written Opinon dated Nov. 23, 2013 in related PCT Application No. PCT/US2013/054407.

* cited by examiner

LATCHING MECHANISM FOR A MODULE

CROSS-REFERENCE TO RELATED APPLICATIONS

This application is a divisional of U.S. patent application Ser. No. 12/573,637, filed Oct. 5, 2009 and titled LATCHING MECHANISM FOR A MODULE, which is incorporated herein by reference in its entirety.

BACKGROUND

1. Field

Embodiments relate generally to communications modules. More particularly, example embodiments relate to a latching mechanism suitable for use in selectively securing a communication module within a receptacle of a host device.

2. Related Technology

Communication modules, such as electronic or optoelectronic transceiver or transponder modules, are increasingly used in electronic and optoelectronic communication. Some modules are pluggable, which permits the module to be inserted into and removed from a receptacle of a host device, such as a host computer, switching hub, network router, or switch box. Some host devices include multiple receptacles and can therefore accommodate multiple modules simultaneously. Each module typically communicates with a printed circuit board of the host device by transmitting and/or receiving electrical data signals to and/or from the host device printed circuit board. These electrical data signals can also be transmitted by the module outside the host device as optical and/or electrical data signals.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF SOME EXAMPLE EMBODIMENTS

Some embodiments relate to a latching mechanism suitable for use in selectively securing a communication module within a receptacle of a host device.

One example embodiment includes a latching mechanism having a latch, a cam and a slider. The cam is configured to rotate about an axis of rotation. The cam is also configured to displace an end of the latch when the cam is rotated about the axis of rotation. The slider is operably connected to the cam and is configured to cause the cam to rotate about the axis of rotation.

Another example embodiment includes a module having a shell and a latching mechanism. The shell defines a cavity within which at least one transmitter and at least one receiver are disposed for transmitting and receiving data signals. The shell includes two slots. The latching mechanism has a cam, a latch and a slider. The cam includes two pins defining an axis of rotation. The pins are received in the slots of the shell. The cam also includes a connecting portion extending between the two pins, a lifting member extending from the connecting portion, and a cam leg extending from each end of the connecting portion. The latch has first and second ends. The first end of the latch is positioned above the lifting member of the cam and the second end of the latch is secured to the shell. The slider has two cutouts within which the cam legs of the cam are received.

Additional features of the invention will be set forth in the description which follows, and in part will be obvious from the description, or may be learned by the practice of the invention. The features of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Figure 1A:
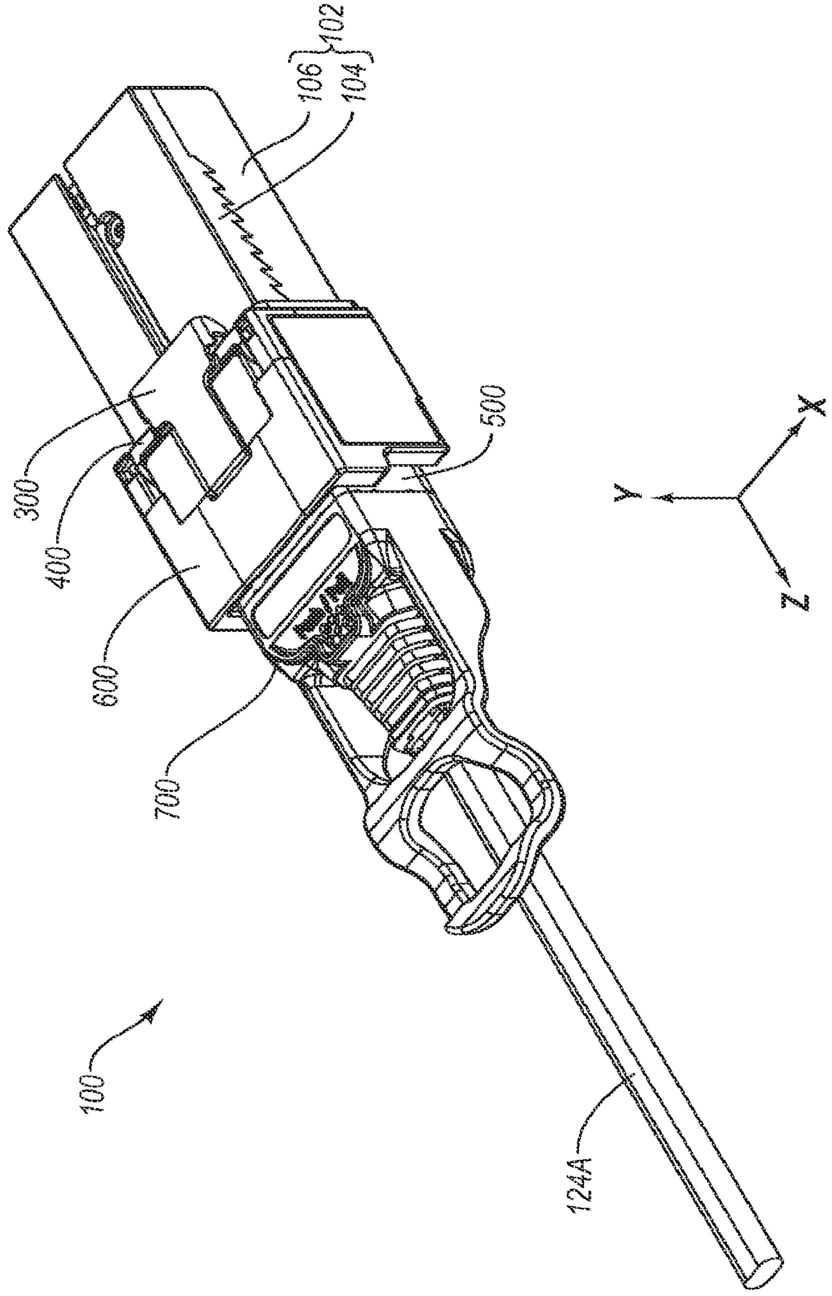
FIGS. 1A-1C illustrates an example module in which embodiments of a latching mechanism can be implemented.

Example embodiments relate to a latching mechanism suitable for use in selectively securing a communication module within a receptacle of a host device. Some example embodiments of the latching mechanism include a latch, a cam and a slider. The latch is configured to engage a structure of a host device. The cam is configured to rotate about an axis of rotation and to displace an end of the latch when the cam is rotated about the axis of rotation to thereby disengage the latch from the structure of the host device. The slider is operably connected to the cam and is configured to cause the cam to rotate about the axis of rotation.

In some embodiments, the latching mechanism allows the module within which the latching mechanism is implemented to be inserted into a receptacle using an intuitive push-to-latch action and to be removed using an intuitive pull-to-release action. Alternately or additionally, the latching mechanism is configured to substantially prevent frictional erosion of the receptacle by the latching mechanism during removal of the module from the receptacle. In some embodiments, the latching mechanism creates an audible sound when the module has been completely inserted into the receptacle, which may assure a user that the module has been properly inserted into the receptacle. Alternately or additionally, the latching mechanism incorporates a retaining cover that may function as a thermal insulator to protect a user from being burned by touching the module and/or that may be color coded to convey information about the module to a user.

The embodiments described herein can be implemented in various communication modules, including electrical modules and optoelectronic modules. As used herein, the term "optoelectronic module" includes modules having both optical and electrical components. Examples of electronic and optoelectronic modules include, but are not limited to, active electrical cables, active optical cables, transponders, transceivers, transmitters, and/or receivers. Electronic and optoelectronic modules can be used, for instance, in telecommunications networks, local area networks, metro area networks, storage area networks, wide area networks, and the like and can be configured to conform with one or more standardized form factors or multi-source agreements ("MSAs"), including the CXP, CFP, XFP and SFP+form factors, without restriction. It will be appreciated, however, that the electronic and optoelectronic modules need not comply with standardized form factor requirements and may have any size or configuration necessary according to a particular design.

The communication modules according to some embodiments can be configured for electrical and/or optical signal transmission and reception at a variety of per-second data rates including, but not limited to, 10 Gigabits per second ("G"), 40G, 100G, or higher. As used herein, the terms "10G", "40G", "100G", and similar terms represent rounded approximations of common signaling rates and have the meanings commonly understood by those of skill in the art.

Furthermore, the communication modules according to some embodiments can be configured for optical signal transmission and reception at various wavelengths including, but not limited to, 850 nm, 1310 nm, 1470 nm, 1490 nm, 1510 nm, 1530 nm, 1550 nm, 1570 nm, 1590 nm, or 1610 nm. Further, the communication modules can be configured to support various transmission standards including, but not limited to, 10 Gigabit Ethernet, 100 Gigabit Ethernet, 1×, 2×, 4×, 10×, and 16× Fibre Channel, and 1×, 4× and 12×SDR, DDR and QDR Infiniband.

Reference will now be made to the drawings wherein like structures will be provided with like reference designations. It should be understood that the drawings are diagrammatic and schematic representations of exemplary embodiments and, accordingly, are not limiting of the scope of the present invention, nor are the drawings necessarily drawn to scale.

I. Example Module

Figure 1B:
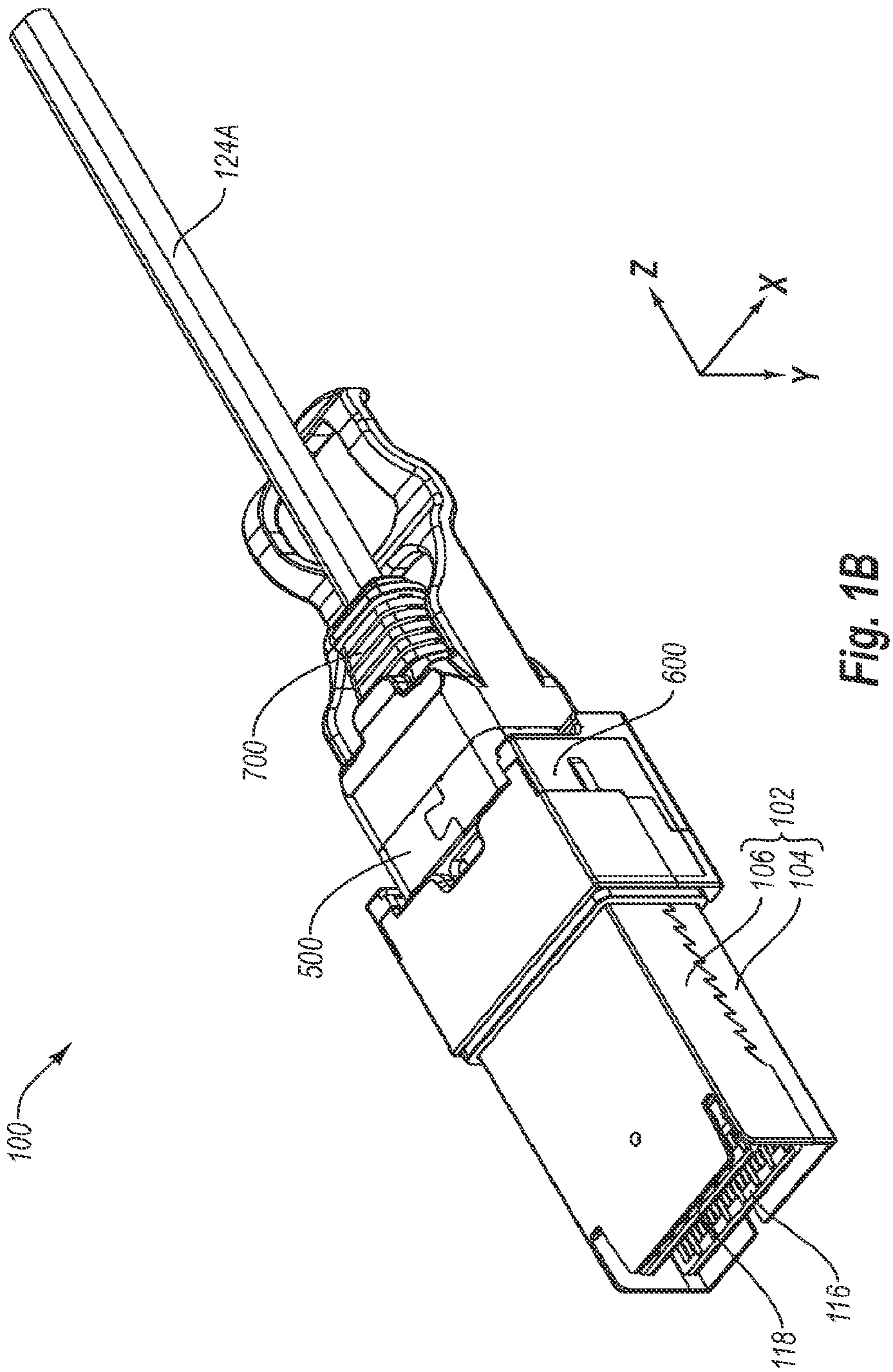
Figure 1C:
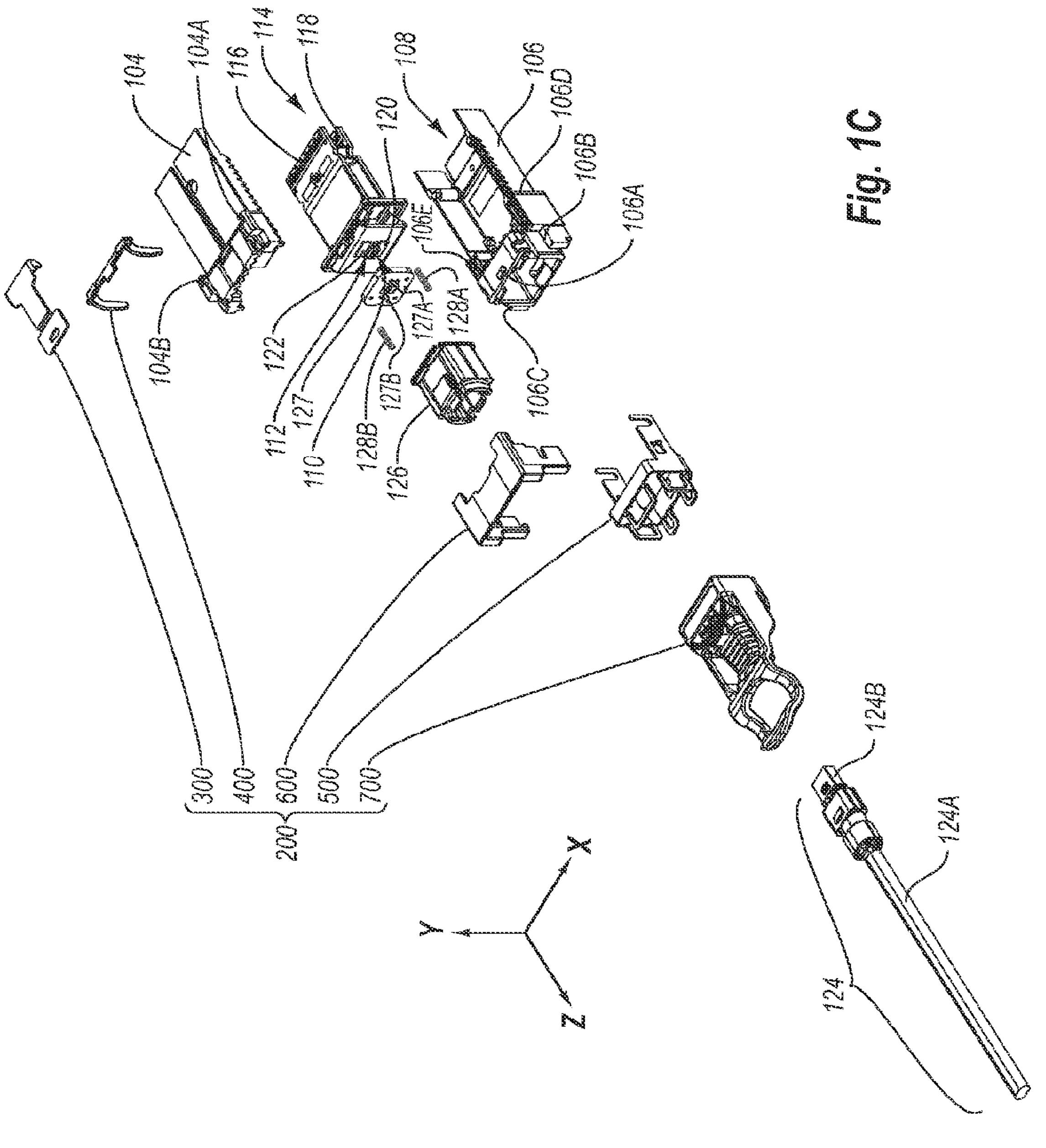

Reference is first made to FIGS. 1A-1C, which depict an example communication module 100 ("module 100") for use in transmitting and receiving optical signals in connection with a host device (not shown) that is operatively connected in some embodiments to a communication network (not shown). FIGS. 1A-1C include, respectively, a front perspective view, an upside-down rear perspective view, and an exploded front perspective view, of the module 100.

As illustrated in FIGS. 1A-1C, the module 100 includes a shell 102 made up of a top shell 104 and a bottom shell 106. Although the shell 102 is illustrated as being made up of two components (i.e., top shell 104 and bottom shell 106), the shell 102 can alternately or additionally be made up of a unitary component and/or three or more components.

As best seen in FIG. 1C, the top shell 104 includes two slots 104A, 104B, details of which are explained in greater detail below with respect to FIG. 4. Further, although not required in all embodiments, the bottom shell 106 includes a protrusion 106A, two inverse shoulders 106B, 106C, and two cam stops 106D, 106E in the illustrated example, details of which are explained in greater detail below with respect to FIGS. 3 and 6A-6B.

As best seen in FIG. 1C, the shell 102 defines a cavity, generally indicated at 108, within which are disposed at least one optical transmitter 110 and at least one optical receiver 112. In this and some other examples, the optical transmitter 110 is a 12×1 array of vertical cavity surface emitting lasers ("VCSELs") and the optical receiver 112 is a 12×1 array of p-type, intrinsic, n-type ("PIN") photodiodes. Alternately, the optical transmitter 110 can include other types of optical transmitters, such as edge-emitting lasers, in the same or different quantities or configurations. Similarly, the optical receiver 112 can alternately include other types of optical receivers in the same or different quantities or configurations. In other embodiments, the module 100 implements electrical transmitters and receivers, rather than optical transmitters and receivers 110, 112.

A printed circuit board assembly ("PCBA") 114 is at least partially disposed in the cavity 108. The PCBA 114 includes, among other things, edge connectors 116, 118, a laser driver 120, and a post amplifier 122. The edge connectors 116, 118 interface with a host device to communicate electrical data signals between the host device and the module 100. Electrical data signals received from the host device are provided to the laser driver 120, which drives the optical transmitter 110 to emit optical data signals representative of the received electrical data signals. Alternately or additionally, optical data signals can be received by the optical receiver 112 which converts the received optical data signals to electrical data signals and provides the electrical data signals to the post amplifier 122 for amplification prior to being communicated to the host device via one or both of edge connectors 116, 118.

With continued reference to FIG. 1C, a cable assembly 124 is provided that includes a plurality of optical fibers (not shown) disposed within cable cladding 124A and a fiber optic connector 124B. In other examples, the cable assembly 124 includes a plurality of electrical wires and an electrical connector, rather than optical fibers and a fiber optic connector 124B. Alternately, the cable assembly 124 is omitted altogether in some configurations.

The optical fibers of cable assembly 124 may include, for example, 12 transmit multimode parallel ribbon fibers and 12 receive multimode parallel ribbon fibers, or a total of 24 multimode parallel ribbon fibers. In other examples, the optical fibers are multimode fibers or single mode fibers having any number of transmit fibers and any number of receive fibers implemented in a parallel ribbon or as individual fibers.

The fiber optic connector 124B is received within alignment guide 126 which partially positions the optical fibers of the cable assembly 124 within the module 100. The module 100 additionally includes a lens block 127 with overmolded lens pins 127A and 127B. The fiber optic connector 124B, lens block 127 and lens pins 127A and 127B collectively cooperate to align the optical fibers of the cable assembly 124 with the optical transmitter 110 and optical receiver 112 such that optical signals can be emitted onto and/or received from the optical fiber(s) of cable assembly 124.

The module 100 further includes a plurality of springs 128A, 128B (FIG. 1C) and a latching mechanism 200 (FIG.

1C) having a latch 300 (FIGS. 1A, 1C), cam 400 (FIGS. 1A, 1C) and slider 500 (FIGS. 1A-1C). Optionally, the latching mechanism 200 also includes a retaining cover 600 (FIGS. 1A-1C) and a boot 700 (FIGS. 1A-1C). Briefly, the springs 128A, 128B are configured to bias the slider 500 in a non-activated position and the latching mechanism 200 is configured to selectively secure the module 100 within a receptacle of a host device. Additional details regarding the springs 128A, 128B and the latching mechanism 200 are provided below.

As shown in FIGS. 1A-1C, the module 100 is implemented as an active optical cable, meaning the module 100 includes optical transmission media (e.g., the optical fibers of cable assembly 124), components used to convert electrical signals to optical signals (e.g., laser driver 120 and optical transmitter 110), and components used to convert optical signals to electrical signals (e.g., optical receiver 112 and post amplifier 122) all integrated in a single apparatus (e.g., the module 100). Other embodiments include active electrical cables as well as modules lacking integrated transmission media.

Furthermore, as illustrated in FIGS. 1A-1C, the module 100 is substantially compliant with the CXP form factor as defined by the Infiniband Trade Association. In other embodiments, the module 100 is configured to be substantially compliant with other form factors including, but not limited to, the CFP, XFP or SFP+form factors.

II. Latching Mechanism

Figure 2A:
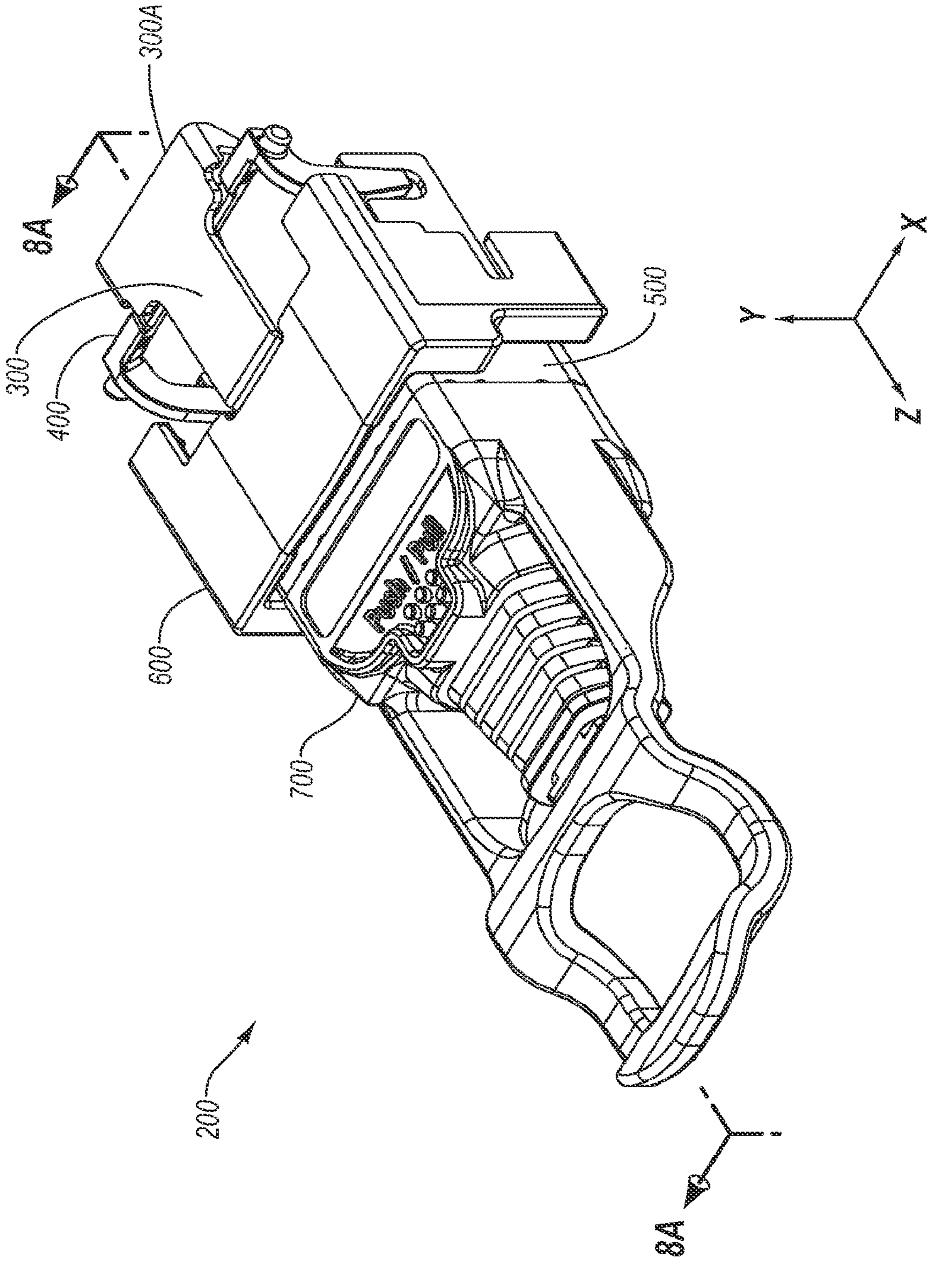
FIGS. 2A-2B illustrate an example of the latching mechanism of FIGS. 1A-1C in additional detail.
Figure 2B:
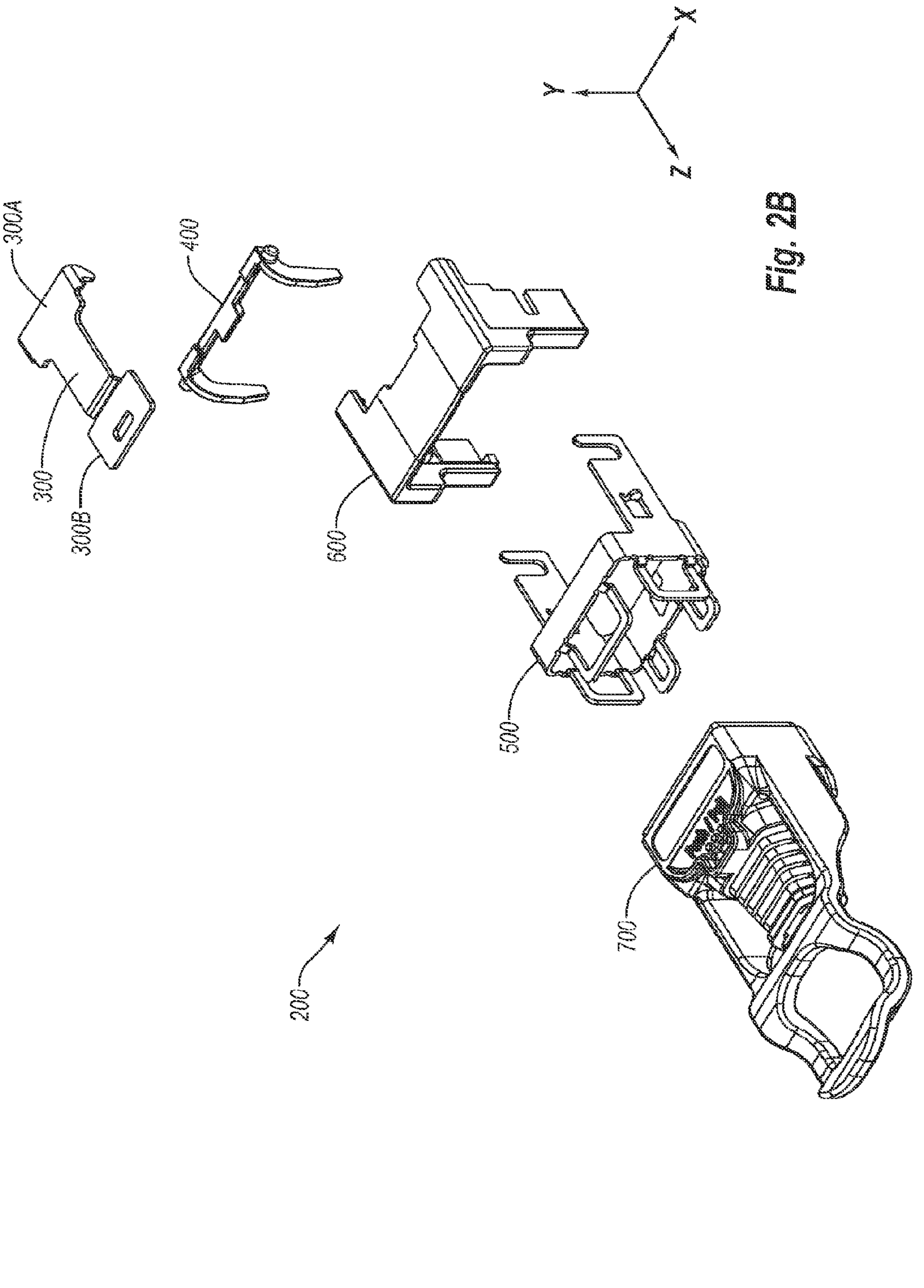

FIGS. 2A and 2B disclose a front perspective view and an exploded front perspective view of the latching mechanism 200. A broad overview of the components of latching mechanism 200 will be provided with respect to FIGS. 2A and 2B before explaining each of the components in greater detail below with respect to FIGS. 3-7B. Briefly, the latch 300 includes a first end 300A configured to engage a structure of a receptacle of a host device. As shown in FIGS. 2A and 2B, for example, the latch 300 includes protrusions on the first end 300A that are configured to engage corresponding cutouts, depressions, cavities, or other suitable structures formed in the receptacle of the host device.

The cam 400 is configured to rotate about an axis of rotation and, after sufficient rotation, to displace the first end 300A of latch 300 so that the first end 300A of latch 300 disengages the structure of the receptacle of the host device. In this manner, a module that incorporates the latching mechanism 200, such as the module 100 of FIGS. 1A-1C, can be removed from the receptacle of the host device.

The slider 500 is operably connected to the cam 400 and is configured to cause the cam 400 to rotate about the axis of rotation. Although not shown, in some embodiments, the slider 500 includes an extension, protrusion, handle, or other element that can be manipulated by a user to activate the slider 500. In the example of FIGS. 2A and 2B, however, the boot 700 is operably connected to the slider 500 and the boot 700 includes a handle that can be manipulated by a user to activate the slider 500. As used herein, manipulation by a user of a structure and variations thereof refer to a user gripping, grasping, squeezing, pulling, pushing or otherwise applying a force to the structure.

The retaining cover 600 is configured to substantially constrain a second end 300B (FIG. 2B) of the latch 300 from being displaced when the first end 300A of the latch 300 is displaced during rotation of the cam 400 and to secure together a top and bottom shell of a module, such as the top and bottom shell 104, 106 of module 100 of FIGS. 1A-1C. Alternately or additionally, the retaining cover 500 thermally insulates a user against heat generated by the module 100 and/or includes one or more visible indicators that provide information concerning a characteristic of a module in which the latching mechanism 200 is implemented.

A. Latch

Figure 3:
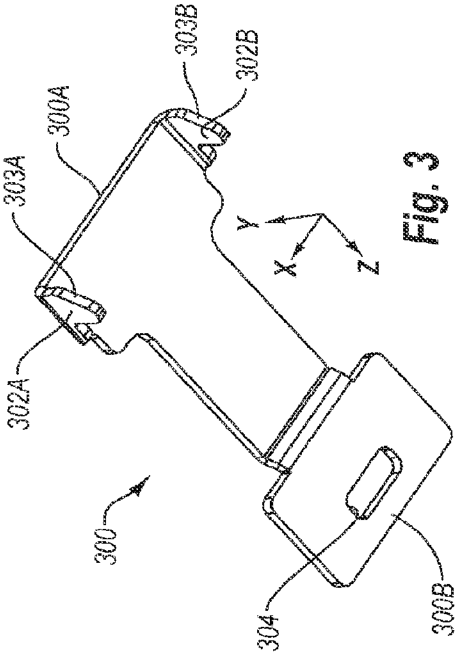
FIG. 3 illustrates an example of a latch that can be implemented in a latching mechanism according to some embodiments.

Turning next to FIG. 3, additional details regarding the latch 300 are disclosed. The latch 300 can be made of sheet metal, plastic, other suitable material(s), or any combination thereof. In some embodiments, the latch 300 is configured to flex in the arbitrarily defined y-direction during operation. As such, the latch 300 is at least partially resilient in some examples. In other examples, the latch 300 is not configured to flex and/or is substantially rigid.

As shown, the latch 300 includes first end 300A and second end 300B. The first end 300A includes a plurality of protrusions 302A, 302B (collectively "protrusions 302") that are configured to engage a corresponding structure, such as a cutout, cavity, recess or depression, of a receptacle of a host device and to thereby selectively secure a module, such as the module 100 of FIGS. 1A-1C, within the receptacle of the host device.

As shown in FIG. 3, each of the protrusions 302A, 302B includes a sloped leading edge 303A, 303B, respectively. During insertion of the module 100 into a receptacle of a host device, the sloped leading edges 303A, 303B contact a leading edge of the receptacle and cause the latch 300 to flex and/or lift such that the first end 300A of the latch 300 is displaced in the positive y-direction to clear the leading edge of the receptacle. In some embodiments, the protrusions 302A, 302B then slide along the receptacle before arriving at a corresponding structure of the receptacle. Further, because the latch 300 is flexed as the protrusions 302A, 302B slide along the receptacle, in some embodiments, the latch 300 snaps into place as the protrusions 302A, 302B engage the structure of the receptacle. Alternately or additionally, the exertion of a resilient downward force on the second end 300B by the retaining cover 600 causes the latch 300 to snap into place. In this and other examples, the snapping of the latch 300 into place provides tactile and/or auditory feedback to a user, which may assure the user that the module 100 has been properly inserted into the receptacle.

While two protrusions 302 are illustrated in FIG. 3, the first end 300A alternately includes more or fewer than two protrusions 302. Alternately or additionally, the locations of the protrusions 302 and the structure configured to be engaged by the protrusions 302 can be changed between the latch 300 and the receptacle of the host device. For example, the first end 300A can include one or more cutouts, cavities, recesses, depressions or other similar structures that are configured to engage corresponding protrusions on a receptacle of a host device. Thus, FIG. 3 merely illustrates one example of a latch 300 configured to engage a structure of a receptacle of a host device and should not be construed to limit the embodiments disclosed herein.

With combined reference to FIGS. 1A-1C and FIG. 3, the second end 300B of latch 300 includes a cutout 304 configured to engage the bottom shell 106 and to substantially prevent the latch 300 from being dislodged from the module 100 when the module 100 is pulled without activating the slider 500. More particularly, the cutout 304 is configured to engage the protrusion 106A of the bottom shell 106. In other embodiments, rather than the second end 300B including a cutout 304, the second end 300B includes a recess, cavity, depression, or other structure for engaging the protrusion 106A. Alternately or additionally, the locations of the cutout 304 and protrusion 106A can be swapped between the latch 300 and bottom shell 106 such that the cutout 304 is included in the bottom shell and the protrusion 106A is included in the latch 300. Further, in some embodiments, the latch 300 includes more than one cutout 304 and the bottom shell 106 includes more than one corresponding protrusion 106A.

B. Cam

Figure 4:
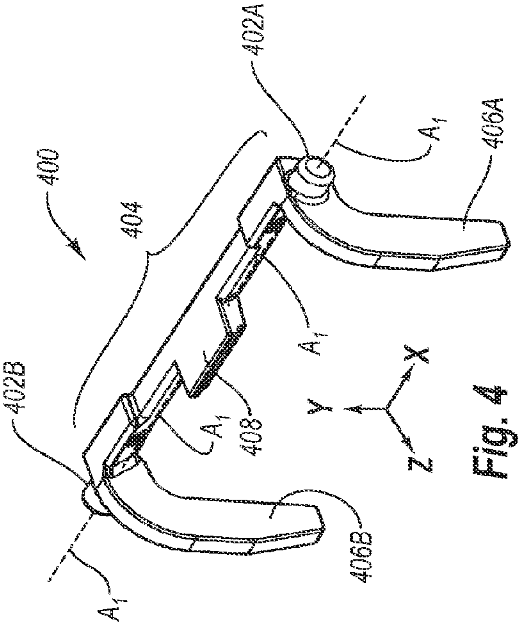
FIG. 4 illustrates an example of a cam that can be implemented in a latching mechanism according to some embodiments.

Turning next to FIG. 4, additional details regarding the cam 400 are disclosed. The cam 400 can be made of die cast aluminum, stainless steel, materials formed by powder metallurgy, other metal(s), plastic, other suitable material(s), or any combination thereof. As shown, the cam 400 includes two pins 402A, 402B defining an axis of rotation $A_1$ of the cam 400. With combined reference to FIGS. 1C and 4, the pins 402A, 402B are configured to be received by the slots 104A, 104B, respectively, of the top shell 104 such that the cam 400 can be rotated about the axis of rotation $A_1$.

The cam 400 further includes a connecting portion 404 extending between the two cam pins 402A, 402B and a cam leg 406A, 406B extending at least partially downward (e.g., in the negative y-direction) from each end of the connecting portion 404. The cam legs 406A, 406B are configured to be engaged by the slider 500 so that activation of the slider 500 causes the cam 400 to rotate about the axis of rotation $A_1$.

Additionally, with combined reference to FIGS. 3-4, a lifting member 408 extends from the connecting portion 404. The latch 300 is positioned with the first end 300A of the latch 300 above the lifting member 408 so as to be displaced in the y-direction by the lifting member 408 when the cam 400 is rotated about the axis of rotation $A_1$, as will be explained in greater detail below with respect to FIGS. 8A-8B.

C. Slider

Figure 5:
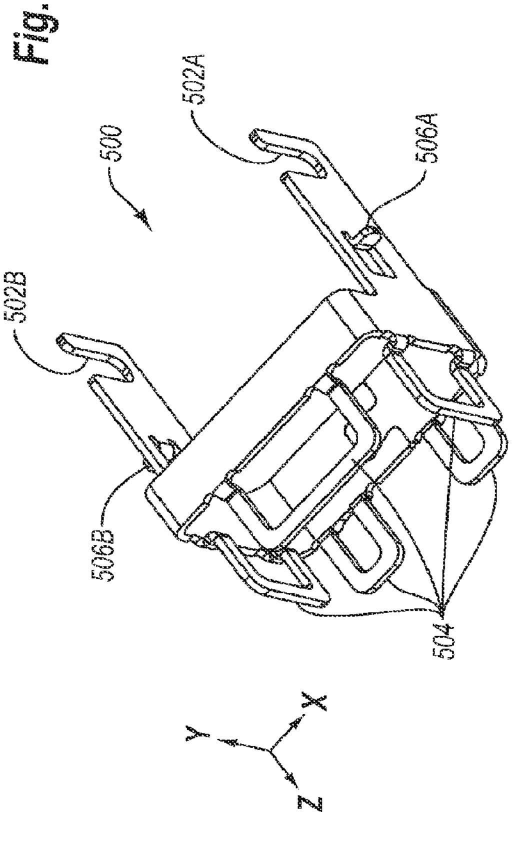
FIG. 5 illustrates an example of a slider that can be implemented in a latching mechanism according to some embodiments.

Turning next to FIG. 5, additional details regarding the slider 500 are disclosed. The slider 500 can be made of sheet metal, other metal(s), plastic, other suitable material(s), or any combination thereof. The slider 500 includes two cutouts 502A, 502B. Each cutout 502A, 502B is configured to receive and engage a cam leg 406A, 406B, respectively, so that activation of the slider 500 causes the cam 400 to rotate about the axis of rotation $A_1$. As used herein, the terms "activation of the slider 500" and variations thereof refer to the direct or indirect application of a force on the slider 500 that causes the slider 500 to move in the arbitrarily defined z-direction with respect to a shell of a module in which the latching mechanism 200 is implemented, such as the shell 102 of FIGS. 1A-1C.

Figure 8A:
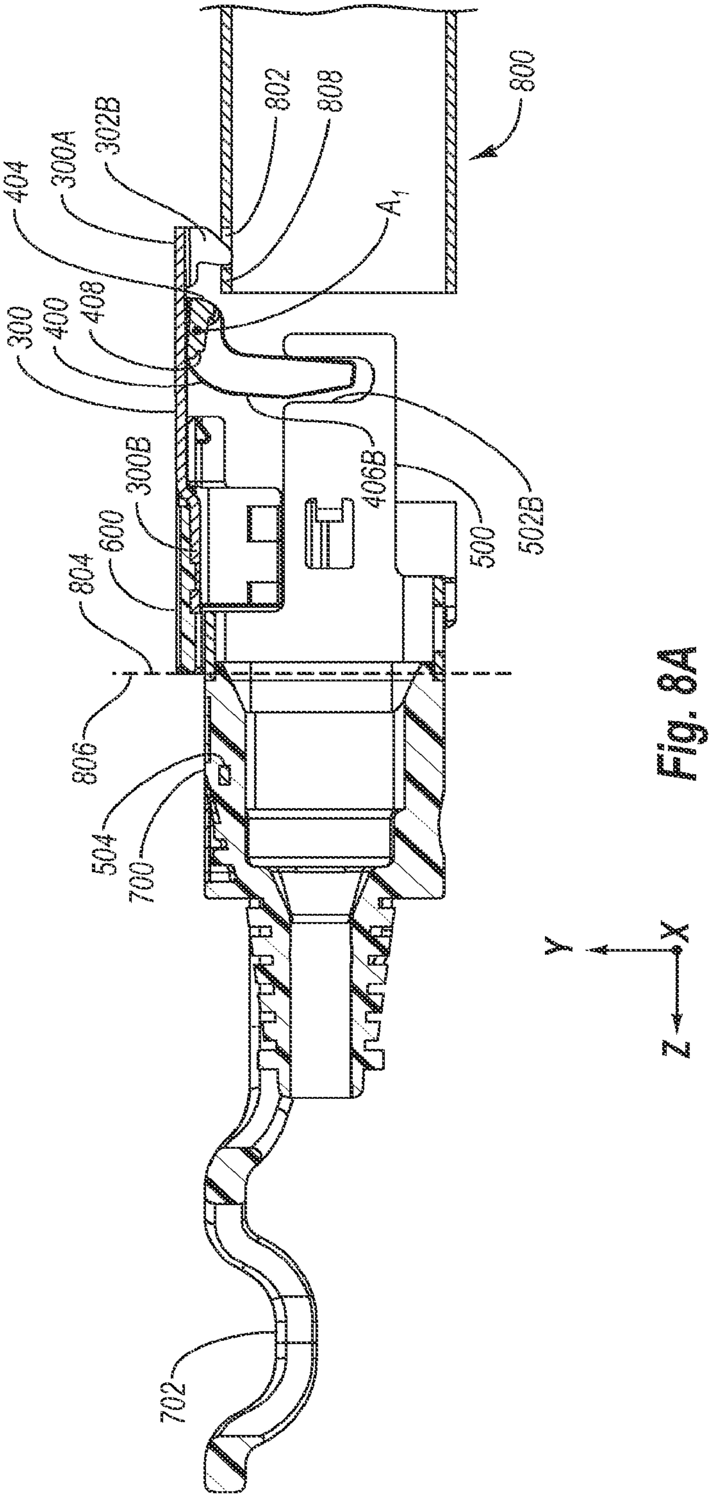
FIG. 8A illustrates a cross-sectional side view of the latching mechanism of FIGS. 2A-2B having a slider in a non-activated position.
Figure 8B:
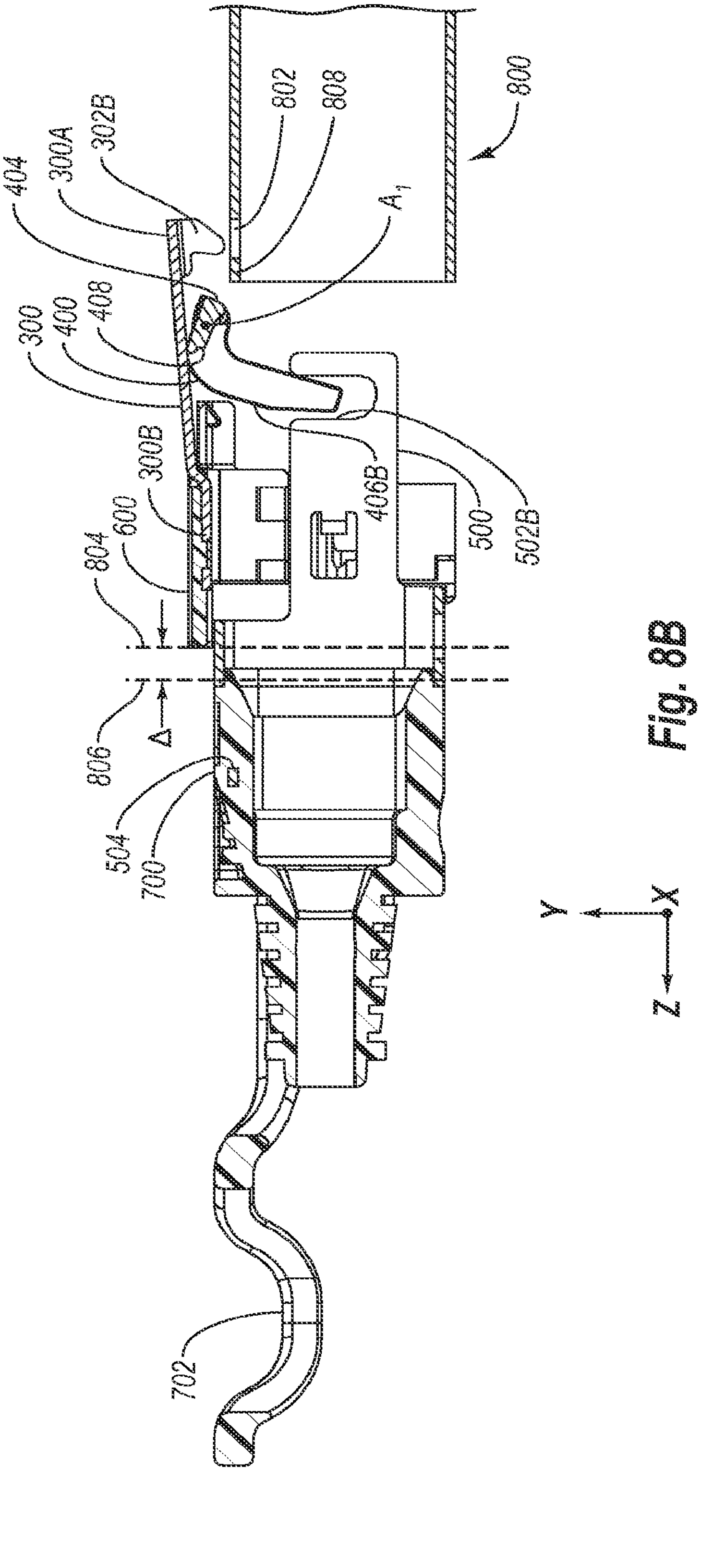
FIG. 8B illustrates a cross-sectional side view of the latching mechanism of FIGS. 2A-2B with the slider in an activated position.

With combined reference to FIGS. 1C and 3-5, activating the slider 500 causes the cam 400 to rotate and thereby displace the first end 300A of the latch. The slider 500 is activated to a fully activated position when the cam legs 406A, 406B contact the cam stops 106D, 106E of bottom shell 106. In the fully activated position, rotation of the cam 400 and displacement of the first end 300A of the latch 300 are sufficient to completely disengage the latch 300 from a receptacle of a host device, as illustrated in FIG. 8B below. In contrast, FIG. 8A illustrates the slider 500 in a non-activated position in which the latch 300 engages a receptacle of a host device.

Returning to FIG. 5, the slider 500 also includes a plurality of coupling structures 504 configured to operably connect the slider 500 to the boot 700. In more detail, a portion of the boot 700 is over-molded on the coupling structures 504 in some embodiments. In other embodiments, the boot 700 is connected to the coupling structures 504 using other techniques that include, for example, the use of adhesives or elements in the boot 700 that interlock with the coupling structures 504 of the slider 500. In these and other examples, the slider 500 can be activated by a user applying a force to the boot 700 in the z-direction since the slider 500 is operably connected to the boot 700. The applied force need not be directed entirely or even partially in the z-direction so long as it results in a force acting on the slider 500 that has a "z" component.

In some examples, the slider 500 is activated by a user applying a force directly to the slider 500, rather than indirect application of the force on the slider 500 via boot 700. In these and other examples, the boot 700 is omitted such that the user manipulates an extension, protrusion, handle, or other element integrally formed in the slider 500 to directly apply a force on the slider 500.

With continued reference to FIG. 5, the slider 500 optionally includes a plurality of tabs 506A, 506B. The tabs 506A, 506B are configured to be engaged by springs of a module, such as the springs 128A, 128B of the module 100 of FIG. 1, so as to bias the slider 500 in a non-activated position, as discussed in further detail below.

D. Retaining Cover

Figure 6B:
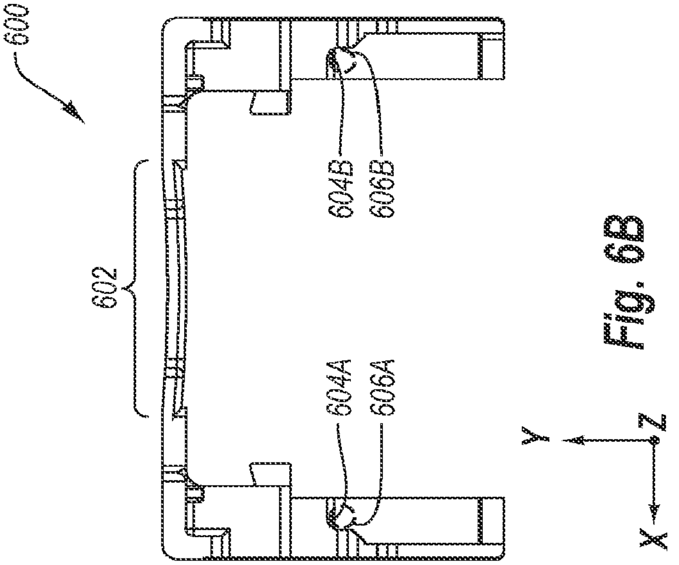
FIGS. 6A-6B illustrate an example of a retaining cover that can be implemented in a latching mechanism according to some embodiments.
Figure 6A:
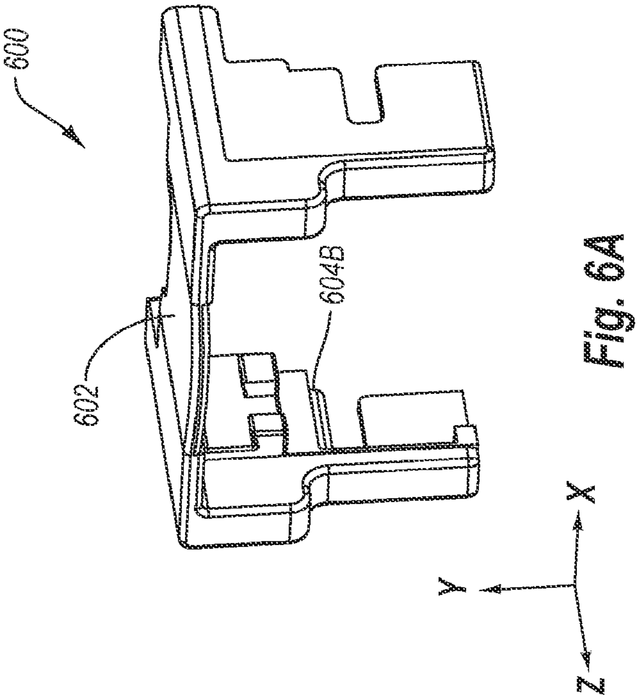

Turning next to FIGS. 6A and 6B, additional details regarding the retaining cover 600 are disclosed. The retaining cover 600 is made of plastic in some embodiments. In other embodiments, the retaining cover 600 is made of die cast metal, other suitable material(s), or any combination thereof.

Although not required in all embodiments, the retaining cover 600 includes a resiliently curved section 602 in the example of FIGS. 6A-6B. With combined reference to FIGS. 1A, 3 and 6A-6B, the resiliently curved section 602 is configured to exert a downward (e.g., negative y-direction) force on the second end 300B of the latch 300 to secure the latch 300 to the module 100. More particularly, the resiliently curved section 602 exerts a downward retaining force on the second end 300B of the latch 300 to ensure that the cutout 304 of the latch 300 engages the protrusion 106A of the bottom shell 106.

With combined reference to FIGS. 2A-2B and 6A-6B, during operation of the latching mechanism 200, activation of the slider 500 causes the cam 400 to rotate, which causes the first end 300A of the latch 300 to be displaced in the arbitrarily defined positive y-direction and thereby be disengaged from a receptacle of a host device. The retaining cover 600, and the resiliently curved section 602 in particular, exerts a downward force on the second end 300B of the latch 300 when the first end 300A is displaced such that the second end 300B is not substantially displaced during displacement of the first end 300A. Accordingly, the retaining cover 600 in some embodiments substantially constrains the second end 300B of the latch 300 from being displaced in the y-direction by rotation of the cam 400.

As already mentioned above, in some embodiments, the retaining cover 600 exerts a downward force on the second end 300B to cause the latch 300 to snap into place. In particular, the resiliently curved section 602 exerts a downward force on the second end 300B. When the slider 500 is activated, the cam 400 is rotated and the first end 300A of the latch 300 is lifted, causing the second end 300B to push upwards on the resiliently curved section 602. When the slider 500 is released, the resiliently curved section 602 pushes downward on the second end 300B sufficiently to cause the first end 300A of latch 300 to snap into place as the latch 300 engages a corresponding structure of a receptacle.

Alternately or additionally, the retaining cover 600 operates to bias the latch 300 in a latched position (FIG. 8B) when no force is being applied to the slider 500. In particular, when the slider 500 is pulled, the cam 400 is rotated, the first end 300A of the latch 300 is lifted, and the second end 300B of the latch 300 pushes against the resiliently curved section 602. When the pulling force on the slider 500 is removed, the resiliently curved section 602 exerts a downward force on the second end 300B of the latch 300 sufficient to cause the first end 300A of the latch 300 to be pushed downward into the latched position. At the same time, the first end 300A of the latch 300 exerts a force on the lifting member 408 of cam 400, causing the cam to rotate back into a non-activated position. As the cam 400 is rotated back into the non-activated position, the cam legs 406A, 408A engage the cutouts 502A, 502B of slider 500 and also force the slider 500 back into the non-activated position. Accordingly, in some examples the retaining cover 600 biases the latch 300 in the latched position and biases the slider 500 in the non-activated position.

In addition to securing the latch 300 to the module 100, the retaining cover 600 is also configured to secure the top shell 104 and bottom shell 102 together in some embodiments. For example, as best seen in FIGS. 1A-1B, the retaining cover 600 partially surrounds the positive z-end of the top shell 104 and bottom shell 106, thereby securing the top shell 104 and bottom shell 106 together.

As already explained above, in some examples, the retaining cover 600 biases the slider 500 in the non-activated position. Optionally, a plurality of springs 128A, 128B is alternately or additionally employed to bias the slider 500 in the non-activated position. For example, as best seen in FIG. 6B, the retaining cover 600 includes two inverse shoulders 604A, 604B and spring-end contact regions 606A, 606B. With combined reference to FIGS. 1C and 6B, inverse shoulders 604A and 604B of retaining cover 600 cooperate with inverse shoulders 106B and 106C of bottom shell 106 to confine springs 128A and 128B within the module 100 in the x- and y-directions. With additional reference to FIG. 5, the spring-end contact regions 606A and 606B cooperate with the tabs 506A and 506B of slider 500 to confine the springs 128A and 128B in the z-direction. Accordingly, during activation of the slider 500, motion of the slider 500 in the positive z-direction causes the tabs 506A and 506B of the slider 500 to compress the springs 128A and 128B against the spring-end contact regions 606A and 606B. When a user removes an applied force to the slider 500, the compressed springs 128A, 128B expand in the z-direction against the spring-end contact regions 606A, 606B and the tabs 506A, 506B to move the slider 500 to the non-activated position. In some embodiments, the springs 128A and 128B are partially compressed in the z-direction when the slider 500 is in the non-activated position so as to ensure that the slider 500 is biased into the non-activated position when no force is being applied to the slider 500.

According to some embodiments, the retaining cover 600 includes one or more visible indicators that provide information concerning a characteristic of a module, such as the module 100, in which the latching mechanism 200 including the retaining cover 600 is implemented. The visible indicators of the retaining cover 600 can include, for example, color-coding implemented via dye, paint, stickers, or the like, raised or depressed characters, printed characters, or any other visible indicator that can serve to identify characteristics of the module 100. The term "characters" as defined herein refers to letters, numbers, punctuation, any other symbol, and any combination thereof. The characteristics of the module 100 that can be identified by the visible indicators of the retaining cover 600 can include, but are not limited to, the data rate, wavelength, communication protocol, form factor, manufacturer, or vendor of the module 100. For instance, the retaining cover 600 may include at least one of several different colors of plastic, where each of the different colors identifies a different operating wavelength of the module 100.

Some modules, such as the module 100 of FIGS. 1A-1C, in which the latching mechanism 200 with retaining cover 600 is implemented, generate heat during operation. At least some of the heat travels through the modules to their outer surfaces and may be sufficiently high out the outer surfaces to burn a user in some cases. To at least partially protect users from being burned by touching a hot module, in some embodiments, the retaining cover 600 includes one or more thermally insulating materials, such as some varieties of plastic and the like. Thus, if a module is hot and the user touches the retaining cover 600, the thermally insulating nature of the retaining cover 600 in this and other embodiments at least partially protects the user from being burned.

E. Boot

Figure 7B:
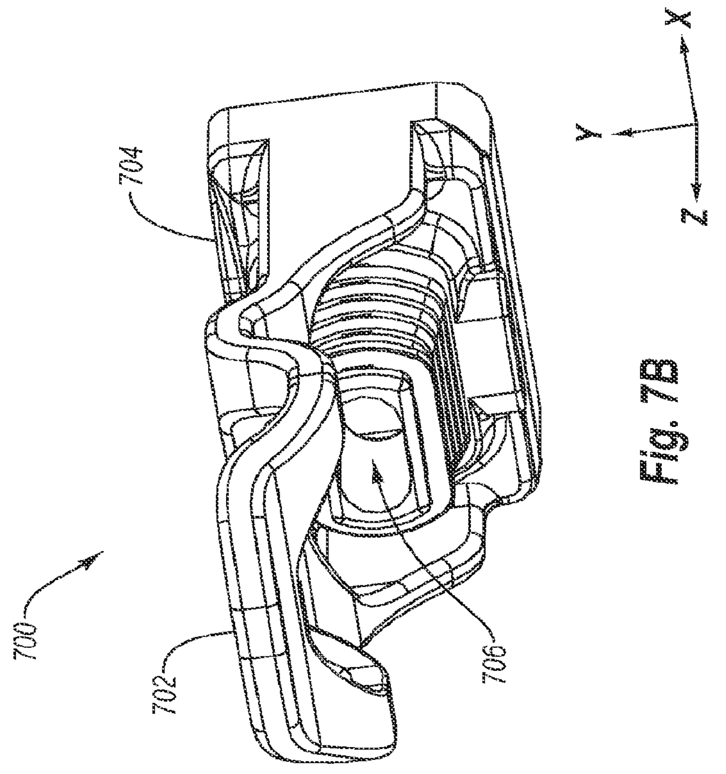
FIGS. 7A-7B illustrates an example of a boot that can be implemented in a latching mechanism according to some embodiments.
Figure 7A:
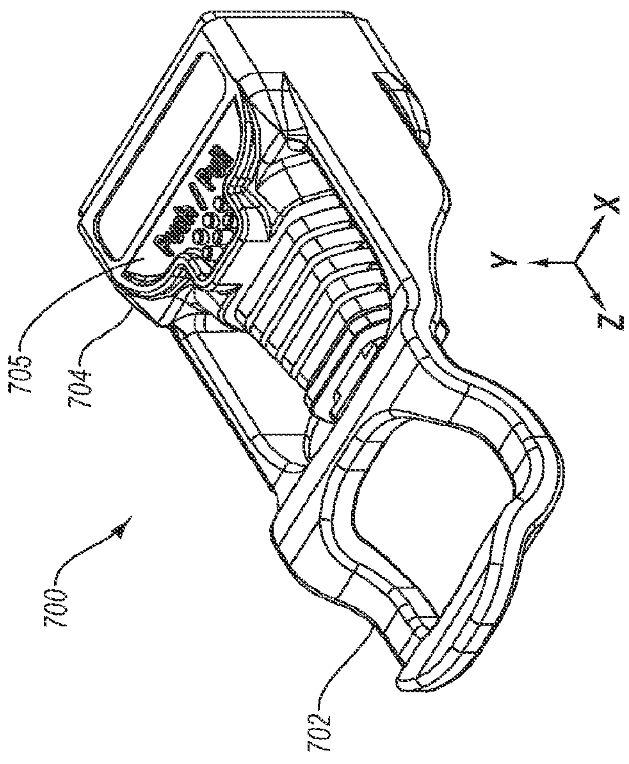

Turning next to FIGS. 7A and 7B, additional details regarding the boot 700 are disclosed. The boot 700 can be made of rubber, plastic, sheet metal, other suitable material(s), or any combination thereof. As already explained above, the boot 700 is operatively connected to the slider 500 such that a user can activate the slider 500 by applying a force in the z-direction to the boot 700. In this regard, the boot 700 includes a handle 702 that is configured to be manipulated by a user for applying the force to the boot 700.

Alternately, the user can manipulate a main body 704 of the boot 700 or a gripping portion 705 to apply the force to the boot 700, rather than manipulating the handle 702. Optionally, the gripping portion 705 includes one or more corrugations, dimples, protrusions, or any combination thereof. In some examples, the handle 702 is partially or completely omitted from the boot 700.

As best seen in FIG. 7B, the boot 700 defines a cavity 706 in the main body 704. With combined reference to FIGS. 1C and 7B, the cavity 706 is configured to permit the cable assembly 124 to pass into the module 100.

III. Example Operation of a Latching Mechanism

Turning next to FIGS. 8A and 8B, aspects of the operation of the example latching mechanism 200 are disclosed. FIG. 8A illustrates a cross-sectional side view of the latching mechanism 200 of FIG. 2A along cutting plan line 8A of FIG. 2A. As shown in FIG. 8A, the slider 500 of latching mechanism 200 is in a non-activated position. FIG. 8B illustrates a cross-sectional side view of the latching mechanism 200 with the slider 500 in a fully activated position.

FIGS. 8A-8B further illustrate a cross-sectional side view of a receptacle 800 of a host device. With combined reference now to FIGS. 1A-8B, the receptacle 800 includes a cutout 802 or other structure configured to be engaged by the latch 300. When the slider 500 is in the non-activated position of FIG. 8A, the protrusion 302B of latch 300 engages the cutout 802 of the receptacle 800 to secure the module 100 (not shown in FIGS. 8A and 8B) within the receptacle 800.

FIG. 8A further illustrates reference planes 804 and 806 that are both arranged normal to the z-axis. The reference plane 804 is aligned with the left-most edge of the retaining cover 600 and remains substantially fixed in the z-direction at least until the latch 300 disengages from the receptacle 800. The reference plane 806 is aligned with the slider 500 and boot 700 so as to coincide with the reference plane 804 when the slider 500 is in the non-activated position of FIG. 8A. However, the reference plane 806 remains fixed with respect to the slider 500 and boot 700 and since the slider 500 and boot 700 move in the z-direction during operation of the latching mechanism 200, the reference plane 806 also thus moves in the z-direction during operation of the latching mechanism 200.

As disclosed in FIG. 8A, the latch 300 is positioned with the first end 300A of the latch 300 on the connecting portion 404 above the lifting member 408 of the cam 400. The cam legs 406A and 406B (only 406B is visible in FIG. 8A) of cam 400 are received within the cutouts 502A and 502B (only cutout 502B is visible in FIG. 8A) of slider 500 to be engaged by the cutouts 502A, 502B during activation of the slider 500.

The boot 700 is overmolded over the coupling structures 504 (only one of coupling structures 504 is visible in FIG. 8A) of slider 500 such that the slider 500 and boot 700 are operatively connected together.

Accordingly, to remove the module 100 (not shown in FIGS. 8A and 8B) from the receptacle 800, a user applies a force to the boot 700 in the positive z-direction, e.g., by grabbing the handle 702 and pulling it in the positive z-direction. Because the boot 700 is operatively connected to the slider 500, when a sufficient force is exerted on the boot 700, the boot 700 and slider 500 move in the positive z-direction until the boot 700 and slider 500 have moved a distance Δ in the positive z-direction with respect to the retaining cover 600. The distance Δ is illustrated in FIG. 8B as the difference between reference planes 804 and 806.

The pins 402A, 402B (not shown in FIGS. 8A-8B) of cam 400 are received within the slots 104A, 104B (not shown in FIGS. 8A-8B) of top shell 104 (not shown in FIGS. 8A-8B). The top shell 104 remains substantially fixed in the z-direction during activation of the slider 500. As a result, the pins 402A, 402B of cam 400 also remain substantially fixed in the z-direction during activation of the slider 500. Because the pins 402A, 402B of cam 400 remain substantially fixed in the z-direction, as the slider 500 moves in the positive z-direction, the cutouts 502A and 502B engage the cam legs 406A, 406B and cause the cam 400 to rotate about the axis of rotation $A_l$ from the position shown in FIG. 8A to the position shown in FIG. 8B.

The retaining cover 600 secures the second end 300B of the latch 300 to the module 100, substantially preventing the second end 300B of the latch from moving during activation of the slider 500. Because the second end 300B of the latch 300 is substantially secured to the module 100 and because the first end 300A of the latch is positioned on the connecting portion 404 above the lifting member 408, sufficient rotation of the cam 400 about the axis of rotation $A_l$ causes the lifting member 408 to displace the first end 300A of the latch 300 in the positive y-direction from the position shown in FIG. 8A to the position shown in FIG. 8B. When the displacement of the first end 300A of the latch 300 is sufficient, the protrusions 302A, 302B of the latch 300 become disengaged from the cutout 802 of the receptacle 800, as best seen in FIG. 8B. In some embodiments, the displacement of the first end 300A of the latch 300 in the positive y-direction is sufficient for the protrusions 302A, 302B to completely clear a portion 808 of the receptacle 800 in the y-direction such that when the module 100 is removed from the receptacle 800, the protrusions 302A, 302B do not slide along the portion 808 and thus do not frictionally erode the portion 808 of the receptacle 800 during removal of the module 100 from the receptacle 800.

After the first end 300A of the latch 300 has been sufficiently displaced in the positive y-direction to disengage the protrusions 302A, 302B from the cutout 802 of receptacle 800, the module 100 can be removed from the receptacle 800 by the continued application of a force to the handle 702 of boot 700 in the positive z-direction. In some embodiments, for example, the force previously applied to activate the slider 500 to cause the cam 400 to rotate and thereby displace the first end 300A of the latch 300 to disengage the protrusions 302A, 302B from the cutout 802 of receptacle 800 subsequently operates to remove the module 100 from the receptacle 800 when the protrusions 302A, 302B are no longer engaging the cutout 802 of receptacle 800.

In some embodiments described herein, the insertion and removal of the module 100 into and from the receptacle 800 is intuitive. In particular, it is intuitive to insert the module 100 into the receptacle 800 by pushing on the module 100 and it is intuitive to remove the module 100 from the receptacle 800 by pulling on the module 100, specifically the handle 702 of boot 700. Alternately or additionally, some embodiments substantially eliminate frictional erosion of the receptacle 800 by the latch 300 during removal of the module 100 by configuring the first end 300A of the latch 300 to clear the portion 808 of the receptacle 800 during activation of the slider 500 and removal of the module 100 from the receptacle 800. Alternately or additionally, in some embodiments the retaining cover 600 is made of a thermally insulating material to protect users from being burned by touching the module 100.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A latching mechanism comprising:

a latch;

a cam configured to rotate about an axis of rotation, the cam further configured to displace an end of the latch when the cam is rotated about the axis of rotation, the cam including two pins that define the axis of rotation, a connecting portion that extends between the two pins, a lifting member that extends from the connecting portion so as to displace the end of the latch when the cam is rotated about the axis of rotation, and a cam leg that extends at least partially downward from each end of the connecting portion; and a slider operably connected to the cam and configured to cause the cam to rotate about the axis of rotation, the slider including two cutouts, each configured to receive and engage a corresponding one of the cam legs.

2. The latching mechanism of claim 1, further comprising a boot operably connected to the slider.

3. The latching mechanism of claim 2, further comprising a boot includes a handle.

4. The latching mechanism of claim 1, wherein the end of the latch is a first end of the latch, the latching mechanism further comprising a retaining cover configured to substantially constrain a second end of the latch opposite the first end of the latch from being displaced by rotation of the cam.

5. The latching mechanism of claim 4, wherein the cover comprises a thermally insulating material.

6. The latching mechanism of claim 4, wherein the retaining cover includes a resiliently curved section configured to bias the latch into a latched position.

7. The latching mechanism of claim 1, wherein the end of the latch is a first end of the latch and wherein the latch includes a second end opposite the first end, the second end having a cutout configured to engage a protrusion of a shell of a module in which the latching mechanism is implemented.

8. The latching mechanism of claim 1, wherein the slider is configured to be activated by a user applying a force to a boot that is operably connected to the slider and the boot is overmolded on the slider.

9. The latching mechanism of claim 1, wherein: the slider is configured to be activated by a user applying a force to a boot that is operably connected to the slider and the boot is attached to the slider using adhesives.

10. The latching mechanism of claim 1, wherein the latch further includes at least one protrusion formed in the end of the latch and configured to selectively engage a corresponding structure of a receptacle, the at least one protrusion having a sloped leading edge.

11. The latching mechanism of claim 1, wherein the latch further includes a cutout, cavity, recess, or depression formed in the end of the latch and configured to selectively engage a protrusion.

12. A latching mechanism comprising:

a slider configured to be activated by a user applying a force;

a cam operably connected to the slider and configured to cause the cam to rotate about an axis of rotation when the slider is activated; and a latch operably connected to the cam and having first a protrusion, the latch configured to be displaced by the cam when the cam is rotated about the axis of rotation, the protrusion configured to selectively engage a corresponding structure of a receptacle, wherein:

the slider is configured to be activated by a user applying a force to a boot that is operably connected to the slider; and the boot is over-molded on the slider.

13. The latching mechanism of claim 12, wherein the slider is configured to be activated by a user applying a force directly to the slider.

14. The latching mechanism of claim 12, wherein the slider includes a tab configured to be engaged by a spring of a module so as to bias the slider in a non-activated position.

15. The latching mechanism of claim 12, wherein the protrusion includes a sloped leading edge.

16. A latching mechanism comprising:

a slider configured to be activated by a user applying a force;

a cam operably connected to the slider and configured to cause the cam to rotate about an axis of rotation when the slider is activated; and a latch operably connected to the cam and having first a protrusion, the latch configured to be displaced by the cam when the cam is rotated about the axis of rotation, the protrusion configured to selectively engage a corresponding structure of a receptacle, wherein:

the slider is configured to be activated by a user applying a force to a boot that is operably connected to the slider; and the boot is attached to the slider using adhesives.

17. The latching mechanism of claim 16, wherein the slider is configured to be activated by a user applying a force directly to the slider.

18. The latching mechanism of claim 16, wherein the slider includes a tab configured to be engaged by a spring of a module so as to bias the slider in a non-activated position.

19. The latching mechanism of claim 16, wherein the protrusion includes a sloped leading edge.

* * * * *

UNITED STATES PATENT AND TRADEMARK OFFICE

CERTIFICATE OF CORRECTION

PATENT NO. : 8,934,752 B2
APPLICATION NO. : 13/784730
DATED : January 13, 2015
INVENTOR(S) : Teo It is certified that error appears in the above-identified patent and that said Letters Patent is hereby corrected as shown below:

In the specification

Column 1, Lines 7-8, delete "Oct. 5, 2009 and titled LATCHING MECHANISM FOR A MODULE," and insert -- Oct. 5, 2009, now Pat. No. 8,391,667, and titled "LATCHING MECHANISM FOR A MODULE", --, therefor.

Column 7, Line 9, delete "rotation Al" and insert -- rotation A1 --, therefor.

Column 7, Line 14, delete "rotation Al." and insert -- rotation A1. --, therefor.

Column 7, Line 21, delete "rotation Al." and insert -- rotation A1. --, therefor.

Column 7, Line 27, delete "rotation Al," and insert -- rotation A1, --, therefor.

Column 7, Line 37, delete "rotation Al." and insert -- rotation A1. --, therefor.

Column 11, Line 26, delete "rotation Al" and insert -- rotation A1 --, therefor.

Column 11, Line 36, delete "rotation Al" and insert -- rotation A1 --, therefor.

In the claims

Column 12, Lines 41-42, Claim 3, delete "further comprising a" and insert -- wherein the --, therefor.

Column 13, Line 7, Claim 11, delete "protrusion." and insert -- protrusion of a receptacle. --, therefor.

Signed and Sealed this
Twentieth Day of October, 2015

Michelle K. Lee
*Director of the United States Patent and Trademark Office*